United States Patent
Houchins et al.

(10) Patent No.: US 12,428,738 B2
(45) Date of Patent: Sep. 30, 2025

(54) ELECTROCHEMICAL SYNTHESIS OF CEMENTITIOUS COMPOUNDS

(71) Applicant: CARNEGIE MELLON UNIVERSITY, Pittsburgh, PA (US)

(72) Inventors: Gregory Houchins, Pittsburgh, PA (US); Venkatasubramanian Viswanathan, Pittsburgh, PA (US)

(73) Assignee: CARNEGIE MELLON UNIVERSITY, Pittsburgh, PA (US)

( * ) Notice: Subject to any disclaimer, the term of this patent is extended or adjusted under 35 U.S.C. 154(b) by 825 days.

(21) Appl. No.: 17/771,197

(22) PCT Filed: Oct. 28, 2020

(86) PCT No.: PCT/US2020/057715
§ 371 (c)(1),
(2) Date: Apr. 22, 2022

(87) PCT Pub. No.: WO2021/086949
PCT Pub. Date: May 6, 2021

(65) Prior Publication Data
US 2022/0380909 A1 Dec. 1, 2022

Related U.S. Application Data

(60) Provisional application No. 63/086,117, filed on Oct. 1, 2020, provisional application No. 62/973,849, filed on Oct. 29, 2019.

(51) Int. Cl.
*C25B 1/18* (2006.01)
*C25B 9/19* (2021.01)
*C25B 11/042* (2021.01)

(52) U.S. Cl.
CPC ............... *C25B 1/18* (2013.01); *C25B 9/19* (2021.01); *C25B 11/042* (2021.01)

(58) Field of Classification Search
CPC ........... C25B 1/18; C25B 9/19; C25B 11/042; C25B 1/01; C25B 5/00; C25B 1/50;
(Continued)

(56) References Cited

U.S. PATENT DOCUMENTS 7,048,900 B2    5/2006   Mathur et al.
10,113,407 B2 * 10/2018  Rau ........................... C25B 1/04
(Continued)

FOREIGN PATENT DOCUMENTS

CA      3016363    A1    9/2017
CN      101545111  A     9/2009
(Continued)

OTHER PUBLICATIONS

Qiao et al., "Synthesis and Thermodynamic Calculation of Cement Chemistry of C—S—H," Bulletin of the Chinese Ceramic Society, vol. 32, No. 5: 903-907 (May 2013).
(Continued)

*Primary Examiner* — Bryan D. Ripa
(74) *Attorney, Agent, or Firm* — KDW FIRM PLLC; Dennis M. Carleton

(57) ABSTRACT

In some aspects, the present disclosure pertains to methods for the electrochemical production of calcium silicate compounds in an electrochemical cell that comprises (a) a Ca-based electrode that comprises calcium metal or an inorganic calcium material, (b) an $SiO_x$-based electrode that comprises a $SiO_x$ material, where x ranges from 1 to 2, and (c) a liquid electrolyte disposed between the Ca-based electrode and the $SiO_x$-based electrode. In these methods, the electrochemical cell is operated under conditions such that calcium cations are produced at the Ca-based electrode and one or more calcium silicate (Ca—Si-oxide) compounds are produced at the $SiO_x$-based electrode. In other aspects,
(Continued)

the present disclosure pertains to systems for the electrochemical production of calcium silicate compounds.

20 Claims, 2 Drawing Sheets

(58) Field of Classification Search
CPC ....... C25B 11/047; C04B 7/02; C04B 7/3453; C04B 7/3456; C04B 12/007; C04B 28/18; Y02P 40/18; C01B 33/24
See application file for complete search history.

(56) References Cited

U.S. PATENT DOCUMENTS

| | | | |
|---|---|---|---|
| 2003/0141199 A1* | 7/2003 | Olbrich | C25B 1/00 205/514 |
| 2004/0238372 A1* | 12/2004 | Olsen | C25B 1/33 205/358 |
| 2009/0301352 A1 | 12/2009 | Constantz et al. | |
| 2015/0191369 A1 | 7/2015 | Kirman | |
| 2018/0291513 A1* | 10/2018 | Jin | C25B 1/33 |

FOREIGN PATENT DOCUMENTS

| | | |
|---|---|---|
| CN | 108690995 A | 10/2018 |
| JP | 2013187109 A | 9/2013 |
| WO | 2022036006 A1 | 2/2022 |

OTHER PUBLICATIONS

Sun et al., "Lithium electrochemistry of SiO2 thin film electrode for lithium-ion batteries" Applied Surface Science vol. 254, Issue 13, Apr. 30, 2008, pp. 3774-3779 [abstract only].
Liu et al., "Silicon oxides: a promising family of anode materials for lithium-ion batteries" Chem. Soc. Rev., 2019, 48, 285.
Xiao et al., "Hybrid Air-Electrode for Li/Air Batteries" Journal of the Electrochemical Society. 157(3) A294-A297. (2010).
International Search Report and Written Opinion for Patent Application No. PCT/US2020/057715, mailed Feb. 1, 2021, 10 pages.
European Search Report and Written Opinion for the European Application No. EP20880930, mailed Jul. 5, 2023, 7 pages.
Licht Stuart et al., "STEP cement: Solar Thermal Electrochemical Production of CaO without CO2 emission" Chem. Commun., 2012, 48, 6019-6021.
Liu et la., "Silicon oxides: a promising family of anode materials for lithium-ion batteries" Chemical Society Reviews, vol. 48, No. 1, Nov. 20, 2018, pp. 285-309.

* cited by examiner

ELECTROCHEMICAL SYNTHESIS OF CEMENTITIOUS COMPOUNDS

RELATED APPLICATIONS

This application is a national phase filing under 35 U.S.C. § 371 claiming the benefit of and priority to International Patent Application No. PCT/US2020/057715, filed Oct. 28, 2020, entitled "Electrochemical Synthesis of Cementitious Compounds", which claims the benefit of U.S. Provisional Patent Application No. 62/973,849, filed Oct. 29, 2019, entitled "Electrochemical Synthesis of Cementitious Compounds" and U.S. Provisional Patent Application No. 63/086,117, filed Oct. 1, 2020, entitled "Electrochemical Synthesis of Cementitious Compounds", the contents of which are incorporated herein in their entireties.

GOVERNMENT RIGHTS

This invention was made with Government support under CBET-1604898 awarded by the National Science Foundation (NSF). The Government has certain rights in this invention.

BACKGROUND OF THE INVENTION

Cement production accounts for nearly 8% of the global $CO_2$ emissions worldwide with a total production of over 4.2 trillion kg (4 billion tons) of cement made annually. The current thermochemical process of cement production emits more than half a kg of $CO_2$ for every kg of cement made, and despite improvement in emissions within the last decade, this industry continues to require significant advancements to meet the $CO_2$ emissions and climate change needs of the future.

Conventional methods of producing cement requires burning fossil fuels and other resources to heat the raw materials to 1450° C. for nearly an hour. Although optimizations of this process have occurred, it still remains an energy and carbon intensive industry. One possible path of mitigating this is with the use of renewable, carbon zero sources of electricity, such as wind and solar energy. The most direct and, therefore, potentially the most energy and cost effective way of doing this, would be with an electrochemical rather than thermochemical process. Simply mimicking the current thermochemical process with heat generated from renewable electricity is also a possible option, but would likely be both costly and impractical. Additionally, a large source of $CO_2$ emission from cement production occurs from the chemical release of $CO_2$ from limestone as one of the first steps of the cement making process. Although an electrochemical process would not necessarily preclude this release, carbon capture presents much less of an issue within the context of an electrochemical cell versus the near-open-air capture of $CO_2$ in modern-day cement plants.

Previous work has proposed an electrochemical process for the generation of CaO from limestone without the generation of $CO_2$ seen in the conventional thermal decomposition. See Stuart Licht, et al. "STEP cement: Solar Thermal Electrochemical Production of CaO without $CO_2$ emission". *Chemical Communications*, 48(48):6019-6021, 2012. This process, however, operates at or near the same temperatures seen in the conventional thermal calcination process used in cement plants today. Additionally, once the CaO is formed, the same high temperature synthesis process is still needed to form the final cementitious products.

Within the context of Li-ion batteries, previous work has shown the ability to electrochemically intercalate lithium into a $SiO_x$ anode to form oxide materials. See Zhenhui Liu, et al. "Silicon oxides: a promising family of anode materials for lithium-ion batteries." *Chemical Society Reviews*, 48(1): 285-309, 2019. Such oxide materials are analogous to chemical compositions in cement to the extent that both contain metal-based silicates.

The present disclosure is directed to a direct electrochemical process that can be performed at a range of temperatures, including at near room temperature, starting from the same or similar raw materials to produce the same calcium silicate (Ca—Si-oxide) compounds present in cement mixtures commercially available today.

SUMMARY OF THE INVENTION

In some aspects, the present disclosure pertains to methods for the electrochemical production of calcium silicate compounds in an electrochemical cell that comprises (a) a Ca-based electrode that comprises calcium metal or an inorganic calcium material, (b) an $SiO_x$-based electrode that comprises a $SiO_x$ material, where x ranges from 1 to 2, and (c) a liquid electrolyte disposed between the Ca-based electrode and the $SiO_x$ based electrode. In these methods, the electrochemical cell is operated under conditions such that calcium cations are produced at the Ca-based electrode and one or more calcium silicate (Ca—Si-oxide) compounds are produced at the $SiO_x$-based electrode.

In some embodiments, the one or more calcium silicate compounds that are produced comprise one or more of Wollastonite ($CaSiO_3$), Rankanite ($Ca_2Si_3O_7$), Belite ($Ca_2SiO_4$) and Alite ($Ca_3SiO_5$).

In some embodiments, which can be used in conjunction with the above aspects and embodiments, the Ca-based electrode comprises calcium metal and operation of the electrochemical cell produces a usable electrical potential.

In some embodiments, which can be used in conjunction with the above aspects and embodiments, the inorganic calcium material comprises calcium oxide, oxygen gas is produced at the Ca-based electrode in addition to the calcium cations, and a source of electrical potential is supplied to drive the electrochemical cell.

In some embodiments, which can be used in conjunction with the above aspects and embodiments, the inorganic calcium material comprises calcium carbonate, oxygen and carbon dioxide gases are produced at the Ca-based electrode in addition to the calcium cations, and a source of electrical potential is supplied to drive the electrochemical cell.

In some embodiments, which can be used in conjunction with the above aspects and embodiments, the inorganic calcium material comprises calcium sulfate, oxygen and sulfur dioxide gas is produced at the Ca-based electrode in addition to the calcium cations, and a source of electrical potential is supplied to drive the electrochemical cell.

In some embodiments, which can be used in conjunction with the above aspects and embodiments, oxygen is introduced at the $SiO_x$-based electrode to reduce or prevent the formation of silicon at the $SiO_x$-based electrode.

In some embodiments, which can be used in conjunction with the above aspects and embodiments, the electrolyte comprises a solution of one or more calcium salts in an organic solvent, in an aqueous solution, or in a solid electrolyte melt.

In other aspects, the present disclosure pertains to systems for the electrochemical production of calcium silicate compounds, wherein the systems comprise an electrochemical cell that comprises (a) a Ca-based electrode that comprises calcium metal or an inorganic calcium material, (b) an $SiO_x$-based electrode that comprises a $SiO_x$ material, where x ranges from 1 to 2, and (c) a liquid electrolyte disposed between the Ca-based electrode and the $SiO_x$-based electrode, and wherein the system is configured to operate the electrochemical cell under conditions such that calcium cations are produced at the Ca-based electrode and one or more calcium silicate compounds are produced at the $SiO_x$-based electrode.

In some embodiments, the Ca-based electrode, the $SiO_x$-based electrode, and the electrolyte are placed inside a closed cell.

In some embodiments, the Ca-based electrode and the $SiO_x$-based electrodes are dipped into the liquid electrolyte.

In some embodiments, which can be used in conjunction with the above aspects and embodiments, the Ca-based electrode comprises an inorganic calcium material selected from calcium oxide, calcium carbonate, and calcium sulfate dihydrate.

In some embodiments, which can be used in conjunction with the above aspects and embodiments, the Ca-based electrode comprises calcium metal.

In some embodiments, which can be used in conjunction with the above aspects and embodiments, the Ca-based electrode comprises a current collector in contact with a material comprising a mixture of the inorganic calcium material, a conductive material, and a binder.

In some embodiments, which can be used in conjunction with the above aspects and embodiments, the $SiO_x$-based electrode is selected from SiO and $SiO_2$.

In some embodiments, which can be used in conjunction with the above aspects and embodiments, the $SiO_x$-based electrode comprises a current collector in contact with an $SiO_x$-containing material comprising a mixture of the $SiO_x$ material, a conductive material, and a binder. In some of these embodiments, the $SiO_x$-based electrode comprises a mesh current collector disposed between and in contact with first and second layers of the $SiO_x$-containing material, an oxygen-gas-permeable membrane is disposed on an outer surface of the first layer, the oxygen-gas-permeable membrane is configured to be exposed to $O_2$ gas during operation of the electrochemical cell, and an outer surface of the second layer is placed in contact with the liquid electrolyte.

In some embodiments, which can be used in conjunction with the above aspects and embodiments, the systems further comprise an ionically conductive separator positioned between the Ca-based electrode and the $SiO_x$-based electrode.

In some embodiments, which can be used in conjunction with the above aspects and embodiments, the electrolyte comprises a solution of one or more calcium salts in an organic solvent, in an aqueous solution or in a solid electrolyte melt.

In some embodiments, which can be used in conjunction with the above aspects and embodiments, the system further comprises a voltage source for supplying energy to operate the electrochemical cell.

DETAILED DESCRIPTION

Figure 1:
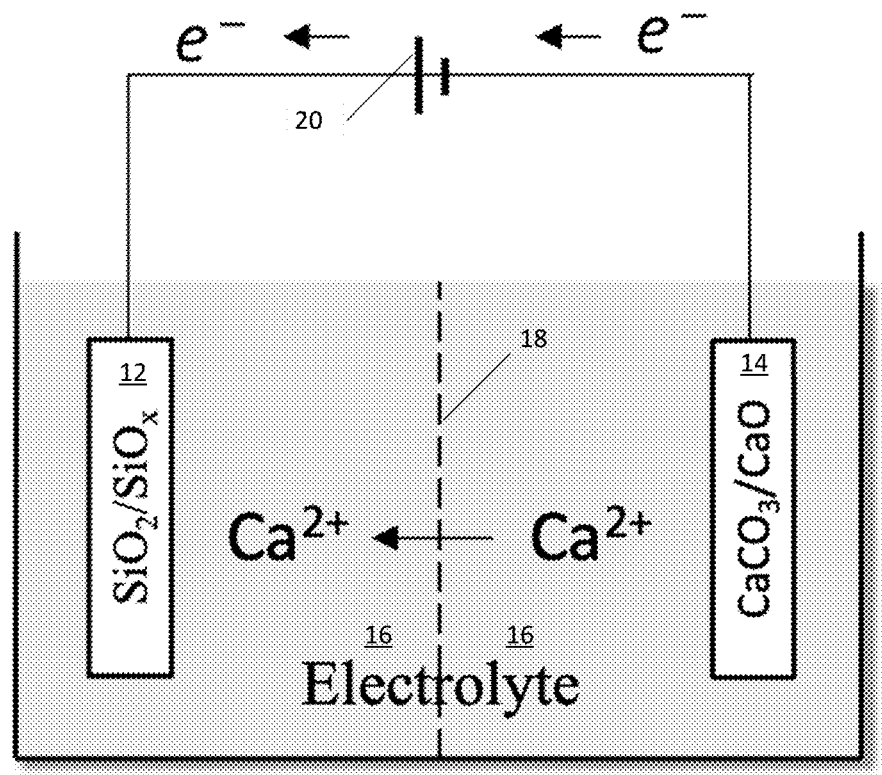
FIG. 1 is a schematic of a proposed device, in accordance with an embodiment of the present disclosure.

The current method of cement production starts with calcium carbonate ($CaCO_3$), which is found in the mineral known as limestone. The limestone is rapidly heated to 900° C. such that $CO_2$ is released and calcium oxide (CaO), also known as lime, is formed in the following reaction:

$$CaCO_3 \rightarrow CO_2 + CaO.$$

The lime is then combined with silicon dioxide ($SiO_2$) and other minerals and heated to 1450° C. until the desired Ca—Si-oxide materials are formed. The target materials include Wollastonite ($CaSiO_3$), Rankanite, ($Ca_3Si_2O_7$), Belite ($Ca_2SiO_4$) and Alite ($Ca_3SiO_5$), with the latter two being the predominate components of Portland cement. Additionally, the extra materials added along with the silicon dioxide do not contribute to the final desired products but rather aid in the formation of the target calcium silicate materials.

The present disclosure pertains to methods for the electrochemical production of calcium silicate compounds (also referred to as Ca—Si-oxide compounds) in an electrochemical cell that comprises (a) Ca-based electrode that comprises calcium metal or an inorganic calcium material, for example, a calcium mineral, (b) an $SiO_x$-based electrode that comprises $SiO_x$, where x ranges from 1 to 2, and (c) a liquid electrolyte disposed between the Ca-based electrode and $SiO_x$-based electrode. The electrochemical cell is operated under conditions such that calcium cations are produced at the Ca-based electrode and one or more calcium silicate compounds is produced at the $SiO_x$-based electrode. Examples of calcium silicate compounds that may be produced include, for example, one or more of Wollastonite ($CaSiO_3$), Rankanite ($Ca_2Si_3O_7$), Belite ($Ca_2SiO_4$), Alite ($Ca_3SiO_5$), or amorphous calcium silicates.

Examples of inorganic calcium materials for use at the Ca-based electrode include calcium metal and calcium minerals such as lime (calcium oxide), limestone (calcium carbonate), gypsum (a dihydrate of calcium sulfate), anhydrite (an anhydrous calcium sulfate), apatite (a calcium phosphate halide or calcium phosphate hydroxide), and fluorite (calcium fluoride), among others.

Examples of $SiO_x$ materials for use at the $SiO_x$-based electrode include silicon monoxide (SiO) and silicon dioxide ($SiO_2$) in crystalline or amorphous form.

In the embodiment where calcium metal is used at the Ca-based electrode and $SiO_2$ is used at the $SiO_x$-based electrode, the following chemical equations are relevant for producing calcium silicate compounds. In this case, the calcium silicate compounds would be formed spontaneously with a usable voltage being produced. The first product formed is Wollastonite ($CaSiO_3$):

$$Ca^{2+} + 2e^- + 3/2 SiO_2 \rightarrow CaSiO_3 + \tfrac{1}{2}Si$$

The next is Rankanite ($Ca_2Si_3O_7$):

$$Ca^{2+} + 2e^- + 7/2 CaSiO_3 \rightarrow 3/2 Ca_3Si_2O_7 + \tfrac{1}{2}Si$$

The next is Belite ($Ca_2SiO_4$):

$$Ca^{2+} + 2e^- + 2Ca_3Si_2O_7 \rightarrow 7/2 Ca_2SiO_4 + \tfrac{1}{2}Si$$

Followed by Alite ($Ca_2SiO_4$):

$$Ca^{2+} + 2e^- + 5/2 Ca_2SiO_4 \rightarrow 2Ca_3SiO_5 + \tfrac{1}{2}Si$$

The overall reaction to go from silicon dioxide and calcium ions to Alite is then:

$$6Ca^{2+} + 12e^- + 5SiO_2 \rightarrow 2Ca_3SiO_5 + 3Si$$

Substituting the $SiO_2$ with SiO at the $SiO_x$-based electrode will result in a change in the final number of Si in the right hand side of each equation.

Additionally, for limestone ($CaCO_3$), lime (CaO} and gypsum ($CaSO_4 \cdot 2H_2O$) electrodes, Ca ions must first be stripped from the material by applying a potential, and then the above reactions will hold. These electrochemical decomposition reactions are as follows:

$$CaCO_3 \rightarrow Ca^{2+} + 2e^- + CO_2 + \frac{1}{2}O_2$$

$$CaO \rightarrow Ca^{2+} + 2e^- + \frac{1}{2}O_2$$

$$CaSO_4 \rightarrow Ca^{2+} + 2e^- + SO_2 + O_2$$

Therefore, the overall equations for these reactions are made by combining these decomposition equations with the above equations.

Positioned between the Ca-based electrode and the $SiO_x$-based electrode is a suitable calcium-ion-conducting electrolyte which may be a liquid ion-conducting electrolyte or a solid ion-conducting electrolyte at room temperature. Examples of liquid calcium-ion-conducting electrolytes include non-aqueous electrolytes that comprise organic solvent such as acetonitrile ($C_2H_3N$), dimethyl sulfoxide (DMSO, $C_2H_6SO$), or other organic solvents that have been shown to work in electrochemical calcium systems, as well as a suitable calcium salt having good solubility in the organic solvent (e.g., having a concentration ranging from approximately 0.05M to 1M or more) such as calcium perchlorate ($Ca(ClO_4)_2$), calcium chlorate ($Ca(ClO_3)_2$), calcium bromate ($Ca(BrO_3)_2$), calcium chloride ($CaCl_2$), calcium bromide ($CaBr_2$), calcium nitrate ($Ca(NO_3)_2$), calcium permanganate ($Ca(MnO_4)_2$), or calcium borohydride ($Ca(BH_4)_2$), calcium tetrafluoroborate ($Ca(BF_4)_2$), among others. Alternatively, an aqueous liquid electrolyte may be employed where salt concentrations are sufficiently high that water is not split into hydrogen and water at operating potentials (e.g., ranging from 6-10 molar, among other possible concentrations). In addition, where elevated temperature operation (e.g., greater than 100° C. to 600° C. or more) is desired, a melt of a solid electrolyte, such as a ceramic-based solid electrolyte, a ceramic-oxide-based solid electrolyte, or a sulfide-based solid electrolyte may be employed.

To prevent unwanted electrical contact between the Ca-based electrode and the $SiO_x$-based electrode, a suitable separator may be employed, examples of which include nonwoven fiber-based separators (e.g., glass, nylon, polyester, cotton, etc.), polymer-film-based separators (polyethylene, polypropylene, poly(tetrafluoroethylene), polyvinyl chloride, etc.), and ceramic-based separators, or any other separator commonly used in battery cells. In a particular embodiment, a borosilicate glass fiber sheet may be used.

A schematic of a proposed electrochemical cell is shown in FIG. 1. On the left, the electrode labelled "$SiO_2/SiO_x$" 12 may comprise any suitable form of $SiO_x$ including $SiO_2$ and SiO. On the right, the electrode labelled "$CaCO_3/CaO$" 14 may comprise Ca metal in which case a potential would be produced, or may comprise any suitable inorganic calcium material such as lime/CaO, limestone/$CaCO_3$, gypsum/$CaSO_4 \cdot 2H_2O$, anhydrite/$CaSO_4$, apatite/$Ca_5(PO_4)_3(F,Cl,OH)$, or fluorite $CaFl_2$, among others, in which case a potential is supplied. For example, by applying an external voltage using a suitable voltage source 20 in a similar manner to charging a battery, a calcium-oxide-based electrode, a calcium carbonate-based electrode, or a calcium sulfate-based electrode can be electrochemically decomposed to produce calcium ions in the electrolyte as well as $O_2$ gas in the case of calcium oxide, $CO_2$ and $O_2$ gas in the case of calcium carbonate, or $SO_2$ and $O_2$ gas in the case of calcium sulfate. The calcium ions can then diffuse/migrate to the $SiO_x$-based electrode where the calcium ions intercalate into the $SiO_x$-based electrode to produce various calcium silicate products. Between the electrodes is a calcium-salt-containing electrolyte 16 and a separator 18 (represented by a dashed line).

As noted above, specific embodiments of the $SiO_x$-based electrode include SiO and $SiO_2$. SiO has been previously used in many Li-ion battery cells, and $SiO_2$ is the conventional raw material source of silicon in cement production. SiO electrodes may be prepared and processed in ways that are seen in Li-ion battery research. This includes heating $SiO_2$ and Si at elevated temperatures to produce gaseous SiO that is then condensed. See, e.g., H. N. Potter. *Trans. Am. Electrochem. Soc.*, 12, 191 (1907). Additionally $SiO_2$ electrodes can be prepared through reactive radio frequency sputtering. See, e.g., Qian Sun, et al., "Lithium electrochemistry of $SiO_2$ thin film electrode for lithium-ion batteries". *Applied Surface Science*, 254(13): 3774-3779, 2008.

In various embodiments, electrodes can be formed on top of current collectors then incorporated into a suitable electrochemical cell format. For example, such electrodes may be placed inside a closed cell form factor such as closed coin cell (also known as a button cell), pouch cell, or other suitable design.

In some embodiments, the $SiO_x$-based electrode may be formed by preparing a slurry that comprise some form of $SiO_x$ (e.g., SiO and/or $SiO_2$) which is then applied to a suitable current collector material (e.g., aluminum, copper, or nickel, among others). The slurry may comprise, in addition to silicon oxide as the active material, a conductive agent such as carbon black or carbon nanotubes, among others, and a binding agent, for example, a polymer based binding agent such as cellulose carboxymethyl cellulose (CMC), polyvinylidene fluoride (PVDF) or polytetrafluoroethylene (PTFE), among others. The silicon oxide, the binder, and the conductive agent materials may be combined in any suitable relative amount, including for example, from about 50 to about 70 wt % silicon oxide, beneficially about 60 wt %, from about 5 to about 15 wt % conductive agent, beneficially about 10 wt %, and from about 20 to about 40 wt %, beneficially about 30 wt %, among other possible relative amounts. To wet the materials and make the slurry, a suitable solvent such as water and/or an organic solvent may be used. For example, water may be used in the case of CMC binder, or N-Methyl-2-pyrrolidone (NMP) may be used in the case of PVDF binder. The slurry is then applied to the current collector and dried under suitable conditions (e.g., under vacuum at around 120° C. for 14 hours), thereby forming the $SiO_x$-based electrode.

If calcium metal is used, the calcium metal may be used directly as the Ca-based electrode (e.g., in the form of a calcium metal foil or wire), in which case the calcium metal can act both as the Ca-source and the current collector. If an inorganic calcium material (e.g., calcium mineral source such as limestone, lime or gypsum) is used, preparation of the electrode can be analogous to the procedure described above. Specifically, a slurry that comprises some form of inorganic calcium material may be applied to a suitable current collector material (e.g., aluminum among others). The slurry may comprise, in addition to the inorganic calcium material as the active material, a conductive agent and a binding agent. The inorganic calcium material, conductive agent and binder materials may be combined in any suitable relative amount, including, for example, from about 50 to about 70 wt % calcium mineral, beneficially about 60 wt %, from about 5 to about 15 wt % conductive agent, beneficially about 10 wt %, and from about 20 to about 40 wt %, beneficially about 30 wt %, among other possible relative amounts. To wet the materials and make the slurry, a suitable solvent such as water and/or an organic solvent may be used. The slurry is then applied to the current collector and dried under suitable conditions, thereby forming the Ca-based electrode.

Another suitable electrode format is a dip electrode. In this case, the electrodes may be produced in a manner analogous to the above except that the slurry is rolled onto a both sides of a current collector mesh material. In some embodiments, a polymeric binding material may be used that is much stronger than those described above (e.g., polymethyl-methacrylate (PMMA), etc.). After drying, the final electrodes can then be dipped into the electrolyte solution within any suitable container (e.g., a beaker, tank, etc.) without the use of a closed cell, enabling much faster reuse of the electrolyte solution.

The above-described processes in which calcium is directly intercalated into a $SiO_x$-based electrode will lead to excess Si mixed in with the final desired product (see, e.g., the above overall reaction for Alite, $6\ Ca' + 12\ e^- + 5\ SiO_2 \rightarrow 2\ Ca_3SiO_{5+3}\ Si$). This excess Si is also electrochemically active and will combine with Ca to form calcium silicides, which may not contribute to the properties of the final products that are desired. At least a portion of this excess Si can be avoided if a source of $O_2$ gas participates in the intercalation reaction. In this case, the formation of calcium silicates would proceed along the lines to follow. As above, the first product formed is Wollastonite ($CaSiO_3$):

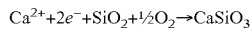
$$Ca^{2+} + 2e^- + SiO_2 + \tfrac{1}{2}O_2 \rightarrow CaSiO_3$$

The next product is Rankanite ($Ca_2Si_3O_7$):

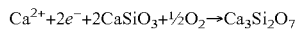
$$Ca^{2+} + 2e^- + 2CaSiO_3 + \tfrac{1}{2}O_2 \rightarrow Ca_3Si_2O_7$$

The next product is Belite ($Ca_2SiO_4$):

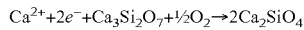
$$Ca^{2+} + 2e^- + Ca_3Si_2O_7 + \tfrac{1}{2}O_2 \rightarrow 2Ca_2SiO_4$$

And the final product is Alite ($Ca_2SiO_4$):

$$Ca^{2+} + 2e^- + Ca_2SiO_4 + \tfrac{1}{2}O_2 \rightarrow Ca_3SiO_5$$

The full reaction to go from Ca ions and silicon dioxide to Alite is then:

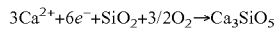
$$3Ca^{2+} + 6e^- + SiO_2 + 3/2 O_2 \rightarrow Ca_3SiO_5$$

To realize this addition of oxygen, an electrochemical cell may be made such that the $SiO_x$-based electrode is permeable to $O_2$ gas. This can be accomplished by creating a hybrid electrode analogous to those previously used in lithium ion battery systems (see Xiao, J., Xu, W., Wang, D., Zhang, J. G. (2010). "Hybrid air-electrode for Li/air Batteries." *Journal of the Electrochemical Society*, 157(3), A294). Electrode preparation can proceed along the lines discussed above, where silicon oxide active material is combined with a conductive material and a binder material and then laminated onto a mesh current collector. This may be done, for example, by combining the active material, conductive material, and binder (e.g., in a weight ratio like that described above), and forming a slurry by the addition of enough solvent such that the slurry is malleable but can hold its shape. The slurry is then rolled out and laminated on each side of a current collector, for example, a copper mesh. For the purpose of $O_2$ exposure, one side of the electrode is laminated with a thin porous membrane such a porous Teflon membrane, among others. The prepared electrode is then preferably dried (e.g., for about 12 h at 120° C.).

Figure 2:
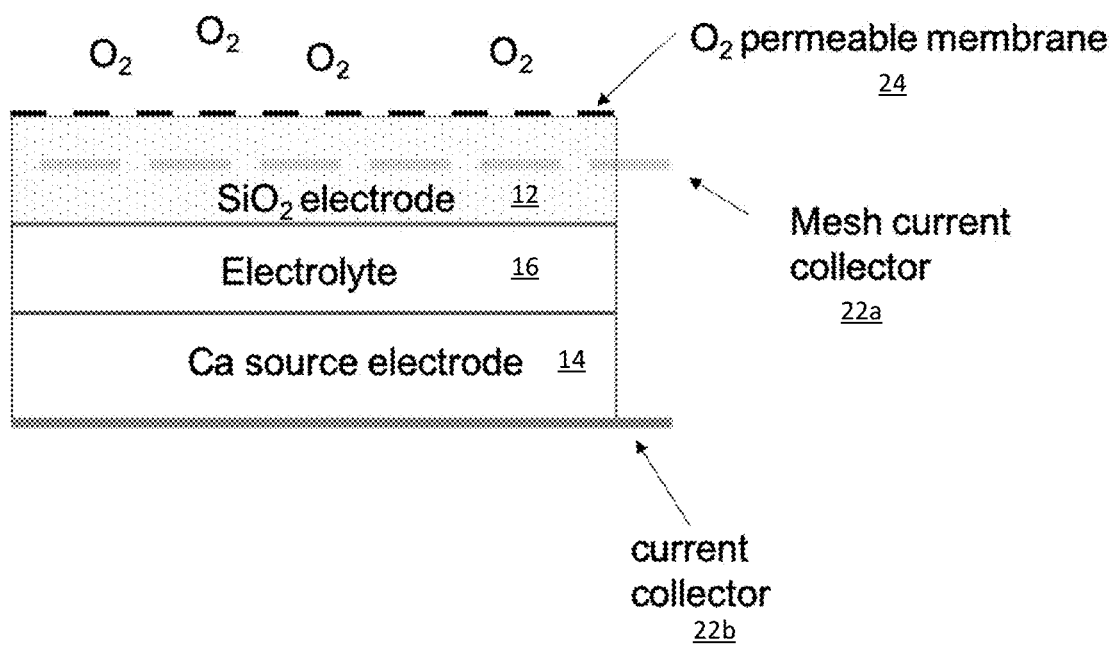
FIG. 2 is a schematic of a proposed device, in accordance with another embodiment of the present disclosure.

A schematic of a proposed electrochemical cell in which such an electrode is employed is shown in FIG. 2, which illustrates a silicon-dioxide-based electrode 12 having a mesh current collector 22a and a porous membrane 24 as described above. Also shown is a Ca-based electrode 14 with an associated current collector 22b. Between the silicon-dioxide-based electrode 12 and the Ca-based electrode 14 is an is a calcium-salt-containing electrolyte 16 and a separator (not shown) as discussed above. As seen from FIG. 2, the silicon-dioxide-based electrode 12 is placed in the electrochemical cell such that one side of the silicon-dioxide-based electrode 12 is exposed to the electrolyte 16 and the opposite side of the silicon-dioxide-based electrode 12 is exposed to $O_2$ gas through the porous membrane 24 during operation.

Examples of implementations of the invention described herein are for purposes of illustration only and are not to be taken as limiting the scope of the invention in any way. The scope of the invention is set forth in the following claims.

We claim:

1. A method for the electrochemical production of calcium silicate compounds in an electrochemical cell that comprises (a) a Ca-based electrode that comprises calcium metal or an inorganic calcium material, (b) an $SiO_x$-based electrode that comprises a $SiO_x$ material, where x ranges from 1 to 2, and (c) a liquid electrolyte disposed between the Ca-based electrode and the $SiO_x$-based electrode, wherein the electrochemical cell is operated under conditions such that calcium cations are produced at the Ca-based electrode and one or more calcium silicate (Ca—Si-oxide) compounds are produced at the $SiO_x$-based electrode.

2. The method of claim 1, wherein the one or more calcium silicate compounds that are produced comprise one or more of Wollastonite ($CaSiO_3$), Rankanite ($Ca_2Si_3O_7$), Belite ($Ca_2SiO_4$) and Alite ($Ca_3SiO_5$).

3. The method of claim 1, wherein the Ca-based electrode comprises calcium metal and wherein operation of the electrochemical cell produces a usable electrical potential.

4. The method of claim 1, wherein the inorganic calcium material comprises calcium oxide, wherein oxygen gas is produced at the Ca-based electrode in addition to the calcium cations, and wherein a source of electrical potential is supplied to drive the electrochemical cell.

5. The method of claim 1, wherein the inorganic calcium material comprises calcium carbonate, wherein oxygen and carbon dioxide gases are produced at the Ca-based electrode in addition to the calcium cations, and wherein a source of electrical potential is supplied to drive the electrochemical cell.

6. The method of claim 1, wherein the inorganic calcium material comprises calcium sulfate, wherein oxygen and sulfur dioxide gas is produced at the Ca-based electrode in addition to the calcium cations, and a source of electrical potential is supplied to drive the electrochemical cell.

7. The method of claim 1, wherein oxygen is introduced at the $SiO_x$-based electrode to reduce or prevent the formation of silicon at the $SiO_x$-based electrode.

8. The method of claim 1, wherein the electrolyte comprises a solution of one or more calcium salts in an organic solvent, in an aqueous solution, or in a solid electrolyte melt.

9. A system for the electrochemical production of calcium silicate compounds, wherein the system comprises an electrochemical cell that comprises (a) a Ca-based electrode that comprises calcium metal or an inorganic calcium material, (b) an $SiO_x$-based electrode that comprises a $SiO_x$ material, where x ranges from 1 to 2, and (c) a liquid electrolyte disposed between the Ca-based electrode and the $SiO_x$-based electrode, and wherein the system is configured to operate the electrochemical cell under conditions such that calcium cations are produced at the Ca-based electrode and one or more calcium silicate compounds are produced at the $SiO_x$-based electrode.

10. The system of claim 9, wherein the Ca-based electrode, the $SiO_x$-based electrode, and the electrolyte are placed inside a closed cell.

11. The system of claim 9, wherein the Ca-based electrode and the $SiO_x$-based electrodes are dipped into the liquid electrolyte.

12. The system of claim 11, wherein the Ca-based electrode comprises calcium metal.

13. The system of claim 11, wherein the Ca-based electrode comprises an inorganic calcium material selected from calcium oxide, calcium carbonate, and calcium sulfate dihydrate.

14. The system of claim 13 further comprising a voltage source for supplying energy to operate the electrochemical cell.

15. The system of claim 13, wherein the Ca-based electrode comprises a current collector in contact with a material comprising a mixture of the inorganic calcium material, a conductive material, and a binder.

16. The system of claim 15, wherein the $SiO_x$-based electrode comprises a current collector in contact with an $SiO_x$-containing material comprising a mixture of the $SiO_x$ material, a conductive material, and a binder.

17. The system of claim 15 wherein the $SiO_x$-based electrode comprises a mesh current collector disposed between and in contact with first and second layers of the $SiO_x$-containing material, and an oxygen-gas-permeable membrane disposed on an outer surface of the first layer, wherein the oxygen-gas-permeable membrane is configured to be exposed to $O_2$ gas during operation of the electrochemical cell, and wherein an outer surface of the second layer is placed in contact with the liquid electrolyte.

18. The system of claim 17, further comprising an ionically conductive separator positioned between the Ca-based electrode and the $SiO_x$-based electrode.

19. The system of claim 18, wherein the electrolyte comprises a solution of one or more calcium salts in an organic solvent, in an aqueous solution or in a solid electrolyte melt.

20. The system of claim 19, further comprising a voltage source for supplying energy to operate the electrochemical cell.

* * * * *